May 17, 1932. C. G. OLSON 1,858,840
HOB TESTER
Filed Aug. 6, 1929 4 Sheets-Sheet 1

Inventor:
Carl G. Olson
By Cleever, Cox & Moore
Attys.

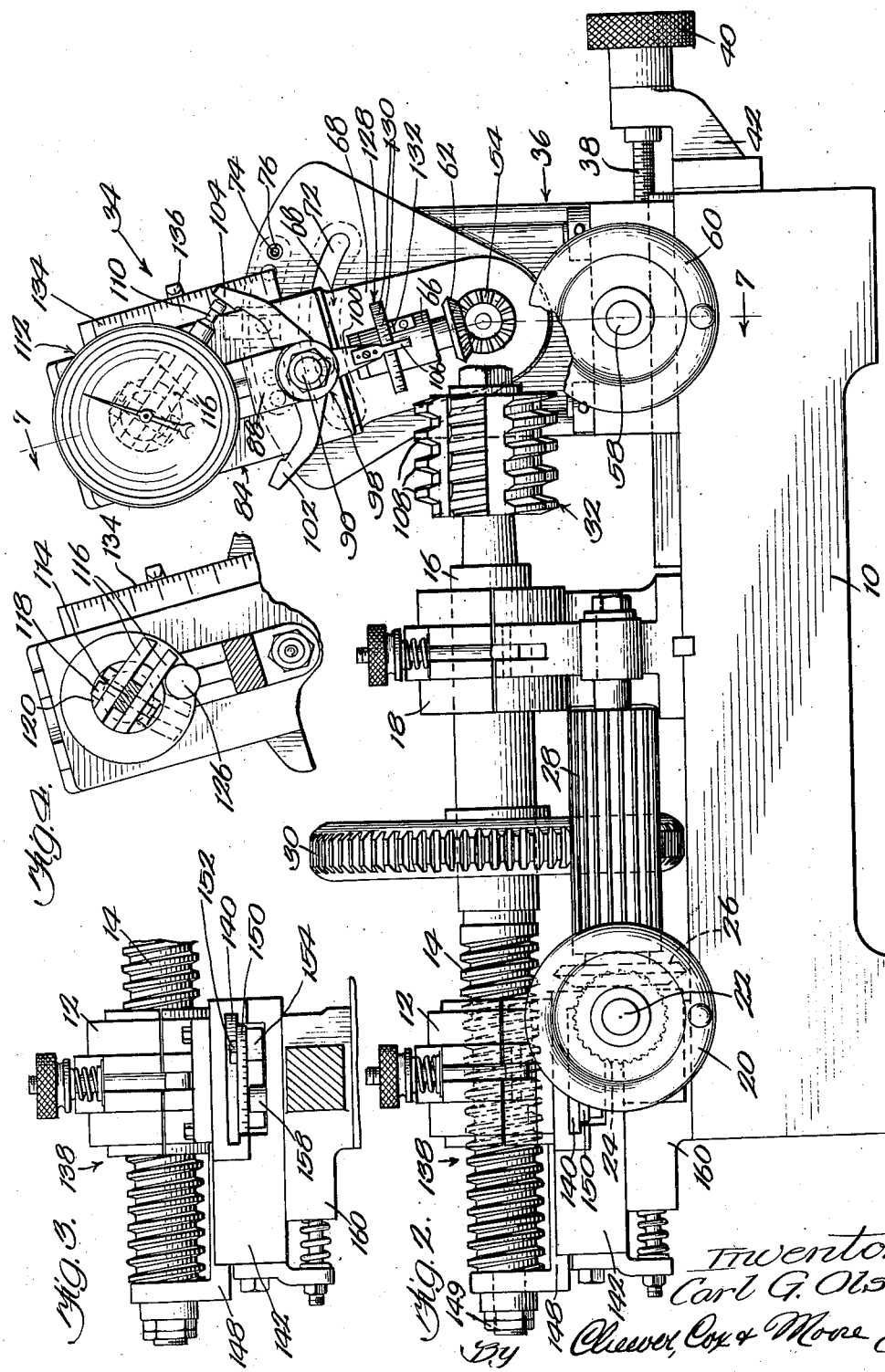

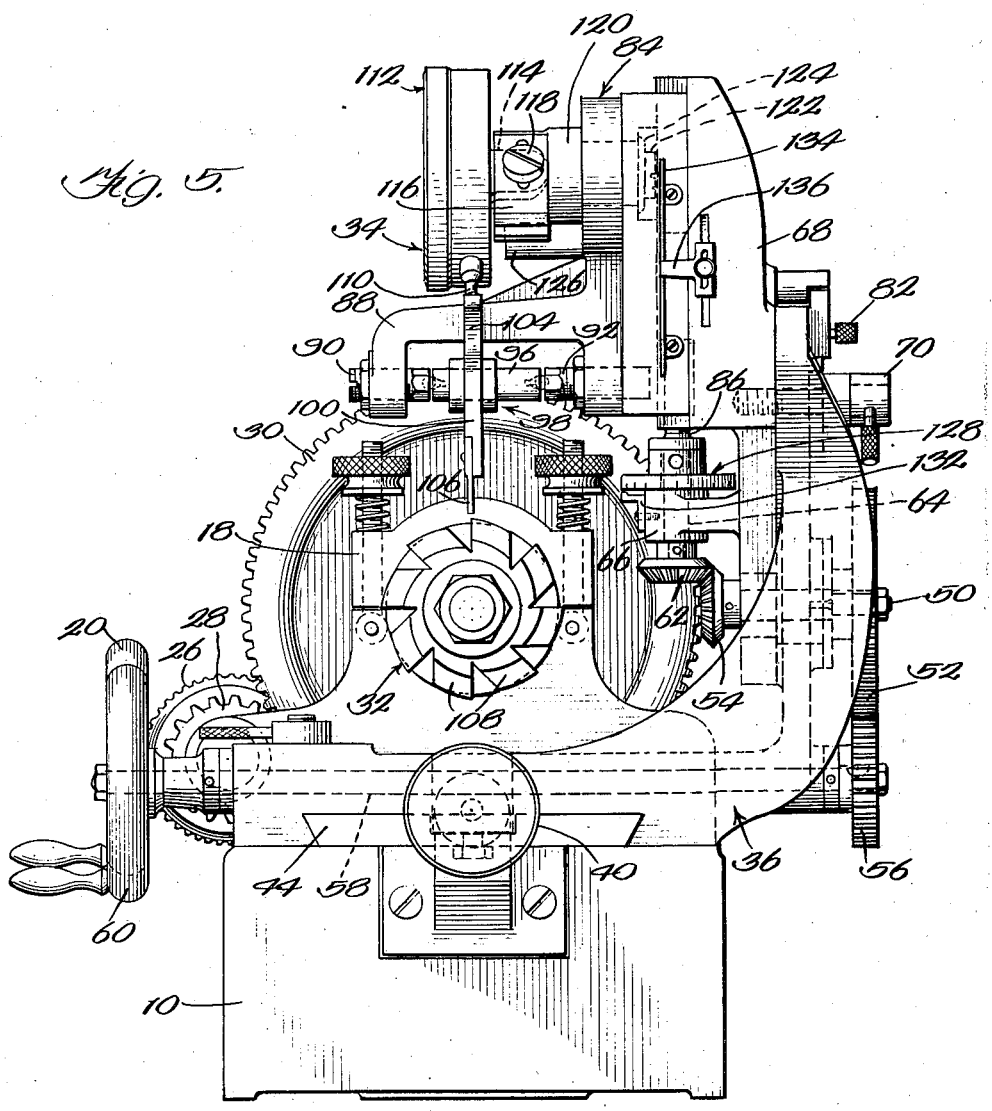

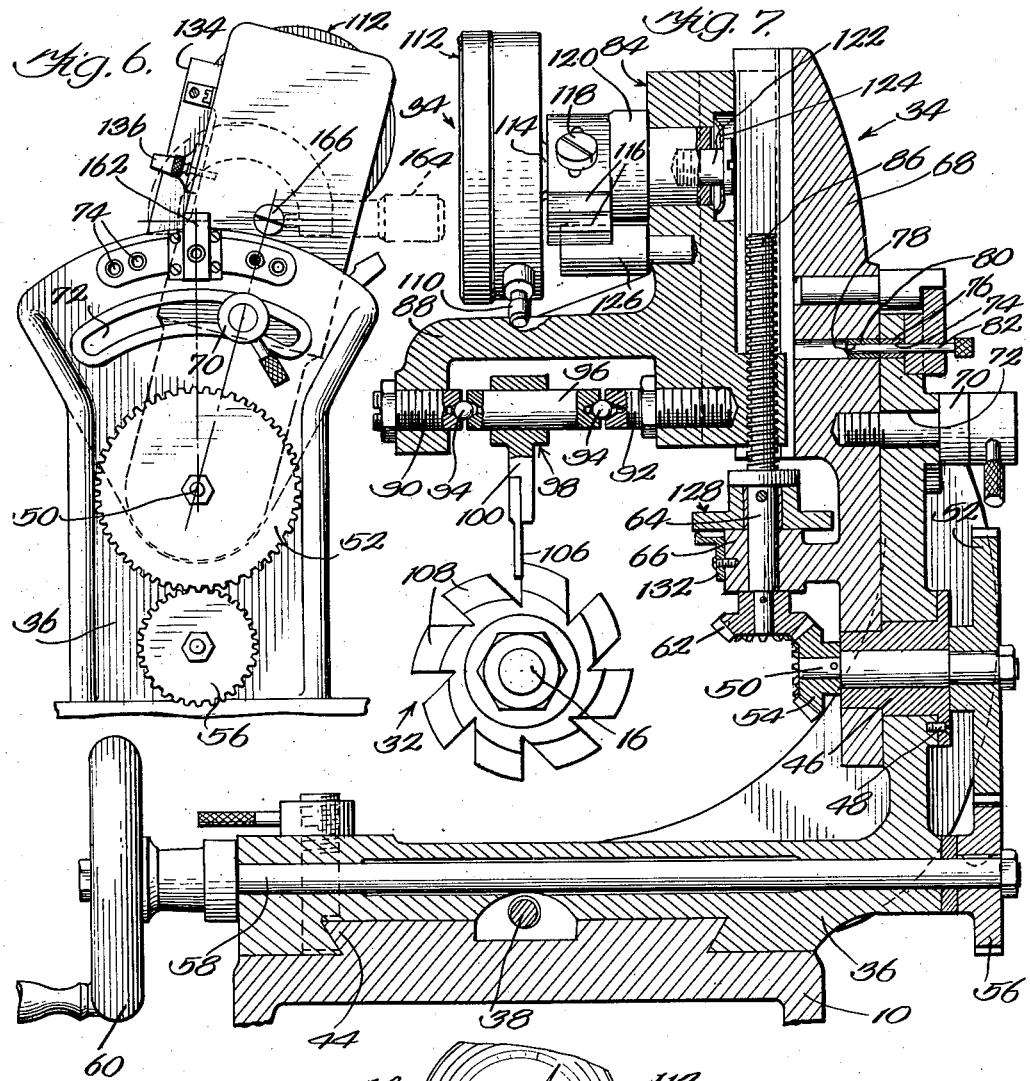
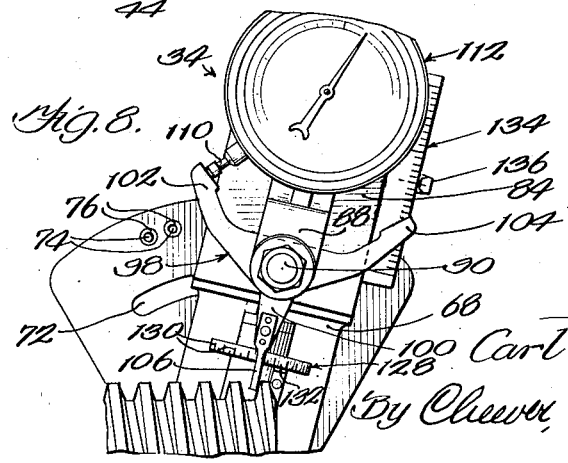

Patented May 17, 1932

1,858,840

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

HOB TESTER

Application filed August 6, 1929. Serial No. 383,909.

My invention relates generally to hob testing apparatus and it is one of the primary objects of the invention to provide a testing device of improved, practical construction whereby the speed and accuracy for testing hobs is greatly facilitated.

To obtain the above mentioned improved operating conditions my invention contemplates the provision of a machine having a work support and work actuating means of improved, simple design as well as a novel device for supporting a testing mechanism in association with the work carried by said supporting means.

More specifically, it is an object of my present invention to provide a testing machine having a work supporting spindle and a master lead screw for causing the axial movement of said work supporting spindle, the structural arrangement being such as to make for simplicity of design and accuracy in operation, the movement of the work or hob, in accordance with the lead thereof, being positively insured.

A still further object of my present invention is to provide a hob testing machine which may be used for testing hobs having various leads without the necessity of changing or replacing the lead screw or making any other substitutions.

Still another object of my invention is to provide improved means for imparting axial movement to the supported hob and to this end I propose to enable said hob to be moved axially during the testing thereof at a desired relatively slow speed and to further enable said hob to be quickly returned to its initial position after the testing operation has been completed.

My invention further contemplates the provision of improved means for supporting the testing mechanism proper, the movement of said testing mechanism toward and away from the work being accomplished with a minimum amount of effort and skill on the part of the operator and without the necessity of making complicated adjustments.

In addition to the above mentioned advantageous characteristics, it is an object of my invention to provide a testing unit proper in which opposite sides of hob teeth may be tested by simply reversing the position of the indicator carried by the testing mechanism, said reversing operation being very conveniently and efficiently accomplished.

With the foregoing and other objects in view which will appear from the following description, the invention resides in the novel and unique combination and arrangement of parts hereinafter described and claimed;

Figure 2 is a front elevational view of the device shown in Figure 1;

Figure 3 is a fragmentary front sectional view taken substantially along the line 3—3 of Figure 1;

Figure 4 is a fragmentary detailed sectional view of the indicator supporting device, said view being taken substantially along the line 4—4 of Figure 1;

Figure 5 is an end view of my improved testing machine as viewed from the right of Figures 1 and 2;

Figure 6 is a rear elevational view of the testing mechanism, a micrometer gauge being shown by dotted lines in association with said testing mechanism;

Figure 7 is a transverse sectional view of the testing mechanism taken substantially along the line 7—7 of Figure 2; and Figure 8 is a front elevational view of the indicator and contactor associated therewith, said indicator being shown in a position which is reverse to that disclosed in Figure 2.

Figure 1:
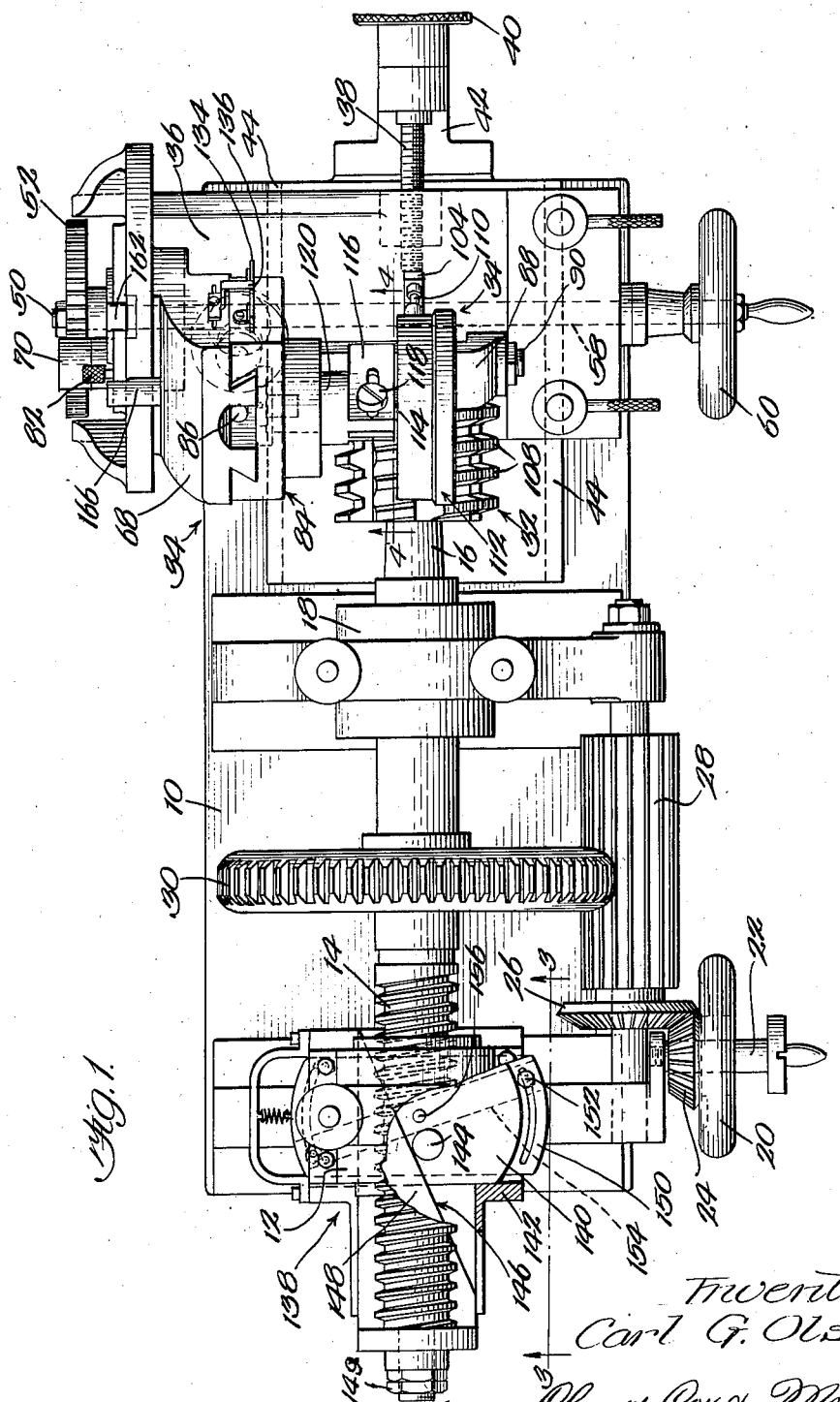
Figure 1 is a plan view of a testing apparatus embodying features of my invention, a portion of the lead screw and compensating device being broken away to more clearly disclose the functional characteristics of said compensating mechanism.

Referring now to the drawings more in detail wherein like numerals have been employed to designate similar parts throughout the various figures, it will be observed that one embodiment of my invention resides in the provision of a testing machine which comprises a main frame or base 10. Suitably supported at one extremity of the base 10 to the left, Figure 2, is a split nut 12 which is designed to receive a lead screw 14.

Formed integral with this lead screw 14 is a work supporting spindle 16 which spindle is rotatable and longitudinally slidable within a split bearing 18 which is mounted upon the base 10. Rotation may be imparted to the work spindle 16 by means of a hand wheel 20 which is rotatably and slidably mounted upon a pin 22. The inner surface of the hand wheel 20 carries a bevel gear 24 which meshes with a companion bevel gear 26. This bevel gear 26 drives an elongated pinion 28 which meshes with a large gear 30 secured to and rotatable with the spindle 16. From the foregoing it will be clear that when the bevel gears 24 and 26 are in mesh and rotation is manually imparted to the wheel 20, a hob 32 carried by the work spindle will experience a rotary as well as an axial movement.

Positioned adjacent the outer extremity of the work spindle 16 is a testing unit which I have designated generally by the numeral 34. This testing unit comprises a frame 36, Figure 7, having a horizontal section which is slidably mounted upon the main frame or base 10. The sliding movement of this portion of the frame 36 is controlled by means of a screw 38 which carries a knurled operating handle 40, Figures 1 and 2. The screw 38 is rotatable within a bracket 42 secured to the end of the base 10 and a guide 44 is provided on the upper surface of the base 10 for directing the sliding movement of the frame 36. This frame 36 is also provided with an upwardly extending or vertical section as clearly shown in Figure 7. A bearing member 46 passes through the vertical section of the frame 36 and is secured against rotation in any suitable manner as by means of a screw 48. A shaft 50 extends through the bearing 46, one extremity of this shaft having a gear 52 mounted thereon and the other extremity having a bevel gear 54 secured thereto. Rotation is imparted to these gears by means of a gear 56 which meshes with the gear 52 and a horizontally disposed drive shaft 58 which extends through the horizontal section of the frame 36, the outer extremity of this shaft 58 supports a conventional hand wheel 60. The bevel gear 54 meshes with a companion bevel gear 62 which is secured at the lower extremity of a shaft 64. This shaft is rotatable within a bearing 66 which extends forwardly from and is formed integral with a swingable frame or carriage 68.

This carriage 68 is pivotally mounted upon a reduced portion of the bushing 46 and is adapted to be secured in various positions of angular displacement by means of a clamping screw 70 which extends through an arcuate slot 72. By tightening this screw 70 the carriage 68 is clamped against the adjacent surface of the upright section of the frame 36 (see Figure 7). As will presently appear, this swinging frame 68 is angularly displaced from its vertical position in accordance with the pressure angle of the hob 32 carried by the work spindle and in order to facilitate the proper positioning of the carriage 68 I provide a series of spaced apertures 74 arranged in an arcuate path within bushings 76 positioned immediately above the arcuate slot 72 in the frame 36. An aperture 78 provided in a bushing 80 mounted within the carriage 68 is adapted to be moved into successive registration with the apertures 74 when the clamping screw 70 is loosened and a locking pin 82, Figure 7, is withdrawn. It will be apparent from the foregoing that the frame 68 may be swung from side to side about the axis of the shaft 50 without interrupting the mechanical connection between the shaft 50 and the shaft 64 which are interconnected through the agency of the bevel gears 54 and 62.

A gauge supporting slide indicated generally by the numeral 84 is slidably mounted upon the front surface of the swinging frame 68 as clearly shown in Figures 1, 5 and 7. The upper portion of the shaft 64 presents a screw 86 which is operatively associated with the lower portion of the slide 84. It will thus be apparent that movement of the slide 84 within the swinging frame 68 is occasioned in response to rotation imparted to the shaft 64 which rotation results from the manual manipulation of the hand wheel 60 already described. Extending forwardly from the main body of the slide 84 is an overhanging arm 88. The outer extremity of this arm 88 carries a screw 90 and the portion of the slide oppositely disposed therefrom also supports a similar screw 92. The extremities of these screws 90 and 92 are formed with a conical recess for receiving ball bearings 94 and interposed between these ball bearings is a shaft 96. The screws 90 and 92 may be moved to adjust the ball bearing mounting for the shaft 96. Mounted upon the shaft 96 is a bracket 98 which is formed with a central depending arm 100 and branch arms 102 and 104 symmetrically arranged with respect to said depending arm as clearly shown in Figures 4 and 8. The depending arm 100 supports a contactor 106 having oppositely disposed contacting points which are adapted to be moved into engagement with either side of the teeth 108 of the hob 32. Either of the symmetrically disposed arms 102 and 104 may engage a plunger 110 of a dial indicator 112.

This dial indicator 112 may be of any conventional design and is provided with a rearwardly extending lug 114, Figures 4, 5 and 7, which is clamped between members 116 by means of a screw 118. The members 116 are carried by a pin 120 which is rotatable within the slide 84 as clearly shown in Figure 7. This pin 120 is secured against outward displacement in any suitable manner as by means of a screw 122 and a washer 124 which bears against the slide 84. The members 116 are adapted to rest against a stop or pin 126 which extends outwardly from the slide 84. When the dial indicator 112 occupies the position shown in Figure 2, the plunger 110 thereof will bear against the arm 104 and when said indicator occupies the position shown in Figure 8, said plunger will bear against the arm 102, the position of the indicator being governed by the test which is to be made, as will hereinafter be more fully explained. In order to observe the degree of movement of the slide 84 along the swingable frame 68, I provide a collar 128 upon the shaft 64 immediately above the bearing 66. This collar 128 is secured to the shaft 64 and the peripheral surface thereof is provided with suitable graduations 130. The graduations 130 are spaced in accordance with the lead of the threads in the screw 86. That is to say, when the shaft 64 is rotated so as to cause a predetermined number of graduations to pass a line on a fixed indicator 132, the slide 84 will have been raised or lowered a corresponding predetermined amount. In addition to serving as a micrometer or a gauging device, the collar 128 also rests upon the bearing 66 so as to properly support the shaft 64. In addition to the micrometer readings which may be read from the graduations 130, another reading may be taken on a scale 134 which is suitably secured along the side of the slide 84 as clearly shown in Figures 3, 4 and 5. An adjustable pointer 136 co-operates with the scale 134 to enable a zero setting to be made as will hereinafter be explained. It will thus be observed that by means of the rotatable collar 128 decimal readings may be conveniently observed and by means of the scale 134 a reading may be taken which directly corresponds to the degree of movement of the slide 84. The two scales are so arranged that for every revolution of the collar, the scale 134 will be moved through a predetermined graduated distance.

If the lead of the threads in the screw 14 corresponds to the lead of the threads in the screw 32, it will be obvious that upon rotation of the work spindle 16, the hob will be moved axially in accordance with the lead of its threads. However, in many instances it may be desirable to test the teeth of hobs which have a slightly different lead from that of the lead screw threads and in such instances I propose to employ a lead compensating or varying device indicated generally by the numeral 138, Figures 1 to 3 inclusive. This compensating device simulates that disclosed in my copending application, Serial No. 254,776, filed February 16, 1928 and includes a cross slide 140 which is movable transversely of a block 142. This cross slide 140 carries a pin 144, Figure 1, which projects upwardly therefrom and which is adapted to be engaged by the angular surface 146 of a cam member 148 supported at one extremity of the lead screw 14. The cam member 148 is secured in position upon the lead screw as by means of lock nuts 149 and during the axial movement of the lead screw to the right, Figures 1, 2 and 3, the angular surface 146 which engages the pin 144, will cause said pin and its associated cross slide 140 to be moved forwardly as viewed in Figure 1. The cross slide 140 is carried by a mounting plate 150 provided at its extremities with arcuate slots which co-operate with adjusting screws 152 to position an actuating bar 154 which is pivoted at 156, Figure 1. When the actuating bar 154 assumes an angular position with respect to the cross slide 140 as shown in Figure 1, said bar, during the movement of the cross slide, will be carried into engagement with a roller 158, Figure 3, mounted upon a base or frame 160 which frame is secured in any suitable manner upon the upper surface of the main base or frame 10. The block 142 is slidably mounted upon the frame 160 and hence upon the engagement of the actuating bar 154 with the roller 158, said block together with the split nut or bearing 12 mounted thereon will be moved to the right, Figures 1 to 3 inclusive, in a direction parallel with the axis of the lead screw. The degree of angularity of the actuating bar will control the degree of movement thus imparted to the split nut. By adjusting the position of the actuating bar 154 I am able to control the axial movement of the lead screw so as to compensate for the lead of the threads in said lead screw. In other words, if the lead of the hob supported by the spindle is greater than the threads of the screw, the movement superimposed upon the lead screw by the compensating device just described can be so adjusted as to cause the axial movement of the supported hob to be in accordance with the lead thereof. In this way the relationship between the contactor points and the surfaces of the hob teeth may be maintained regardless of the fact that the lead of the threads in the hob may differ from the leads of the thread in the lead screw.

In order to test for example the lead of the supported hob 32, the testing unit 34 is vertically adjusted until one of the points of the contactor 106 is positioned so as to engage one of the cutting edges of the hob teeth at a point which is coincident with the rolling pitch line of the hob as shown in Figure 7. This vertical adjustment of the contactor may be obtained by manipulating the hand wheel 60 as already described. The adjustable pointer 136 may be set so that when the zero point on the scale 134 registers with said pointer, the contactor point will be positioned along the rolling pitch line of the hob. In this way the contactor point may be quickly and conveniently positioned. In the event that the lead of the hob does not correspond with the lead of the threads in the lead screw, the device 138 may be adjusted so as to compensate for the difference in these leads. Rotation is then imparted to the hand wheel 20 and this causes rotative and axial movement of the hob 32. This causes each successive hob tooth to be moved into engagement with the contactor point and any variations will be registered by the dial indicator 112. The frame 68 of the testing unit 34 may be positioned either to the left or right depending upon the side of the hob teeth which is being tested. Thus for example, in Figure 2 I have shown the testing unit swung to the left while in Figure 8 said unit is swung to the right. For the purpose of illustration we will assume that the testing unit is initially positioned as shown in Figure 2. When the hob has completed its axial movement to the right, the hand wheel 20 may be moved forwardly so as to disengage the bevel gear 24 from the gear 36 and the large gear 30 may be used as a hand wheel to cause a quick axial return of the hob. To test the opposite side of the hob teeth it is only necessary to swing the testing unit to the right as shown in Figure 8 and to reverse the position of the dial plunger 110. The operation above described may then be repeated. Obviously tests may be made at any point along the hob teeth from the bottom to the top thereof and the various positions at which the contactor point makes these contacts will be indicated by the graduations 130 as well as the graduations on the scale 134.

In addition to testing for the lead of the hob, my improved device may be very effectively employed for testing the normal pressure angle of the teeth. In carrying out this operation, the testing unit is first swung to one side of the vertical plane which passes through the axis of the shaft 50 as for example to the left as shown in Figure 2 and the angular displacement of the unit must correspond with the pressure angle of the hob to be tested. The apertures 74 arcuately spaced along the upper portion of the fixed frame 36 are so arranged as to enable a quick setting of the testing unit in accordance with the pressure angle of the hob which is to be tested. The shifting of the swingable frame 68 may be very readily accomplished by loosening the clamping screw 70 and removing the positioning pin 82. When the proper angular adjustment is obtained this pin may be reinserted. I have provided means by which the angle of obliquity in a vertical plane may be determined trigonometrically. A block 162 shown clearly in Figures 6 and 7 is secured to the rear side of the vertical section of the frame 36 and is positioned medially of a vertical plane which passes through the axis of the shaft 50. This forms a gauge block to be engaged by one of the contactor points of a micrometer gauge 164 shown in dotted lines in Figure 6. The other contactor point of this gauge engages the side of a pin 166 which is positioned medially of the rear side of the swinging frame 68. The measurement shown on the micrometer gauge corresponds to the length of the base of a right angle triangle. A line extending between the axis of the shaft 50 and the center of the pin 166 forms the hypotenuse of said triangle which is a known quantity and a constant one. These two factors becoming known, the angle of obliquity may be readily computed.

Having angularly displaced the testing unit so as to correspond with the pressure angle of the hob to be tested, the hand wheels 20 and 60 may be manipulated so as to bring a point of the contactor 106 into engagement with the side of a hob tooth to be tested. When these adjustments have been made, the contactor will be caused to move radially inwardly and outwardly along the side of the thread and the aberration, if any, at different points will be noted. If the pointer of the dial gauge 112 remains at zero, it will prove that the thread or tooth has the correct slope. After one side of the hob thread has been tested, the testing unit may be swung to the opposite side as already described and the dial indicator plunger moved into contact with the opposite arm 102 of the bracket 98.

From the foregoing it will be apparent that my invention contemplates the provision of a thread or hob testing device which may be very conveniently manipulated and which is of very simple and practical construction. By having the work rotated and moved axially in the manner described, the actuating mechanism is reduced to its simplest form. In other words, it is only necessary to provide a single or integral shaft which serves the double purpose of a work spindle and a lead screw. My improved driving mechanism in the form of the shiftable operating handle and elongated pinion which meshes with the large gear on the spindle shaft, enables the work to be moved slowly during the testing operation and by a simple shifting of the hand wheel and a manipulation of the large gear, the work may be quickly reversed after the testing operation has been completed. This greatly expedites the speed with which testing operations may be performed. By providing a lead compensating device in combination with the above mentioned structure, I have greatly simplified the method of testing hobs which vary in lead. In other words, I provide a single machine which may be employed for testing hobs having leads which vary over a considerably wide range. The manner in which I support and actuate my improved testing unit greatly facilitates the practice of hob testing. The improved actuating means which is operable in response to the manual manipulation of the hand wheel 60 presents a very convenient and practical arrangement of driving gears. Connection between the operating hand wheel 60 and the slide 84 is never interrupted regardless of the swinging movement which may be imparted thereto. The scales are conveniently placed within plain view of the operator and the angular adjustment of the frame 86 may be accomplished with a minimum degree of effort and skill. By having the contactor positioned above the work and movable about a horizontal axis, an arrangement is presented which makes for increased accuracy in making the tests as distinguished from instances where the contactor is movable about a vertical axis. Obviously, the described apparatus is not limited for use in connection with the testing of hobs but may be employed for testing various types of threads or helically configurated rotary bodies.

Having thus described my invention, what I claim as new and desire to secure by Letters Patent is:

1. In a hob testing machine of the class described, a rotary axially movable work supporting spindle, a lead screw for axially moving spindle, threaded means for receiving said lead screw, testing means positioned in association with said work spindle, said testing means including a contactor for engaging the work supported by said spindle, and means for superimposing a compensating movement upon the lead screw during the rotation thereof within the threaded means.

2. In an apparatus of the class described for testing threaded work such as hobs and the like, a rotary axially movable work supporting spindle, a lead screw for actuating said spindle, means for rotating said screw, threaded means for receiving the screw to cause the axial movement of the screw during the rotation thereof, means for slidably supporting said threaded means, means for causing a relative movement between the threaded means and its support during the rotation of the lead screw, and testing means associated with said spindle, said testing means including a contactor for engaging the threads in the work supported by the spindle.

3. In a hob testing apparatus of the class described, means for supporting the work, a contactor means having a central section for engaging the work to be tested, a support for said contactor means, and an indicator associated with said contactor means, said contactor means having surfaces adapted for indepenent engagement with said indicator and arranged symmetrically with respect to said central section.

4. In a hob testing device of the class described, means for supporting the work, a contactor means including a central section and members symmetrically arranged with respect to said central section, a support therefor, and an indicator associated with said symmetrically disposed members, said members being adapted for independent engagement with said indicator.

5. In hob testing apparatus of the class described, means for supporting the work, a second support, an indicator rotatable on said second support and about a given axis, and contactor means on said indicator support for engaging the work to be tested, said contactor means having surfaces adapted to operatively engage said indicator in various positions of displacement about its axis.

6. In a hob testing apparatus of the class described, means for supporting the work, a second support, an indicator rotatable on said second support and about a horizontal axis, and contactor means on said indicator support for engaging the work to be tested, said contactor means having oppositely disposed surfaces for independently engaging said indicator in different positions of its rotative displacement.

7. In hob testing apparatus of the class described, means for supporting the work, a second support, a contactor means carried by said second support and including a central depending member for engaging the work and a pair of arms arranged symmetrically with respect to said depending member, and an indicator means mounted on said second support adjacent said arms, said indicator means being angularly adjustable and having an element for engaging either of said arms.

8. In hob testing apparatus of the class described, means for supporting the work, a contactor means for engaging the work, said contactor means including a central section and having surfaces symmetrically disposed with respect to said central section, a shiftable indicator adapted for association with said surfaces one at a time, a support for said contactor means, and a mounting for said contactor support, said contactor support being angularly adjustable upon said mounting about a substantially horizontal axis for positioning the contactor in accordance with the pressure angle of the thread in the work to be tested.

9. In hob testing apparatus of the class described, means for supporting the work, a frame, a mounting carried by said frame and adjustable about a substantially horizontal axis, a slide supported by said mounting movable radially with respect to the axis of said mounting, contactor means carried by said slide, said contactor means being adapted to engage the work to be tested, and indicator means carried by said slide and operable in response to the engagement of the contactor means with the work.

10. In a hob testing device of the class described, means for supporting the work, a contactor means for engaging the work, a support for said contactor means which is angularly adjustable about a given axis and radially movable with respect to said axis, and actuating means for controlling the radial movement of said contactor support, said actuating means including a driving element whose axis is substantially coincident with the axis about which said contactor support is adjustable.

11. In a hob testing device of the class described, means for supporting the work, a contactor means for engaging the work, a support for said contactor means which is angularly adjustable about a given axis and radially movable with respect to said axis, and actuating means for controlling the radial movement of said contactor support, said actuating means including a toothed driving element whose axis is substantially coincident with the axis about which said contactor support is adjustable.

12. In hob testing apparatus of the class described, means for supporting the work, a contactor for engaging the work to be tested, a support for said contactor which is angularly adjustable about a given axis and radially movable with respect to said axis, and actuating means for slidably moving said contactor support, said actuating means including a driving element extending radially of the axis about which the contactor support is adjustable, and a co-operative driving element which is rotatable about said axis.

13. In hob testing apparatus of the class described, means for supporting the work, a contactor means for engaging the work, a support therefor, a screw for slidably moving said support with respect to a given axis, a mounting for said screw and contactor support which is angularly adjustable about said axis, and rotary driving means for said screw having its axis angularly disposed with respect thereto.

14. In hob testing apparatus of the class described, means for supporting the work, a frame having a horizontal section and a vertical section, a bed slidably supporting the horizontal section of said frame, a horizontal shaft extending through the vertical section, a support mounted on said shaft, means for securing said support in various positions of angular adjustment, a slide on said support movable radially with respect to the axis of said shaft, and contactor means carried by and depending from said support for engaging the work.

15. In a hob testing apparatus of the class described, a work supporting spindle, a frame providing a mounting for said spindle, supporting means extending upwardly from said frame, an indicator rotatably mounted upon said supporting means, contactor means including a member pivotally carried by said supporting means adjacent said indicator means, said contactor means having a central section adapted to extend toward the work supported by the spindle and having sections extending on opposite sides of said central section adapted to be engaged by said indicator, and means for shifting said contactor means toward and away from the work supported by said spindle.

16. In a hob testing apparatus of the class described, a frame, a rotary axially movable work supporting spindle mounted on said frame, a support extending outwardly from and pivotally mounted upon said frame, a slide carried by said support and shiftable toward and away from a work piece supported by said spindle, manually operable means for shifting said slide, an indicator rotatably supported on said slide, and contactor means pivotally mounted on said slide adjacent said indicator, the axes of the indicator, contactor means and said support lying in a common plane, said support being shiftable about its axis to adjust the contactor with respect to the pressure angle of the hob to be tested.

In witness whereof, I have hereunto subscribed my name.

CARL G. OLSON.